United States Patent Office 3,061,732
Patented Oct. 30, 1962

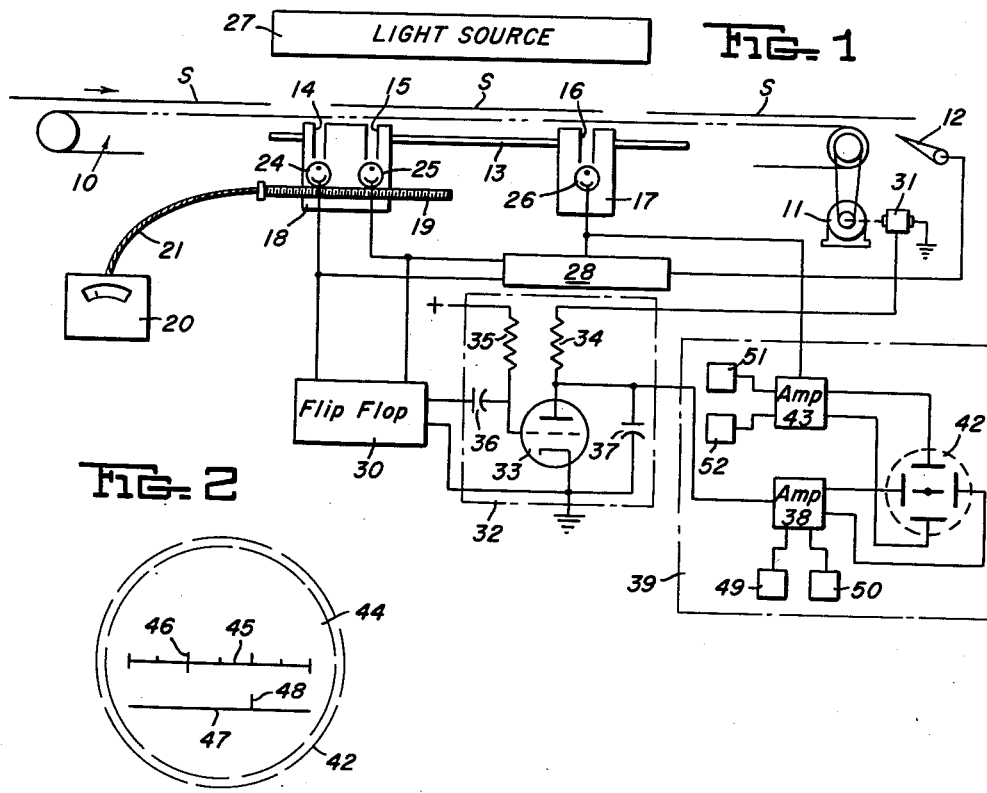

3,061,732
DEVICE FOR MEASURING A LINEAR DIMENSION OF MOVING ARTICLES
James A. Milnes, Pitcairn, Pa., assignor to United States Steel Corporation, a corporation of New Jersey
Filed Sept. 18, 1958, Ser. No. 761,903
10 Claims. (Cl. 250—219)

This invention relates to an improved device for measuring and visually indicating a linear dimension of moving articles.

The device is particularly useful in a shear line in which a flying shear cuts continuous strip into individual sheets, where the device furnishes an immediate indication of the length of each sheet. The device can be used to advantage in conjunction with a classifier which throws out off-length sheets, such as that shown in Coleman and McLauchlan application Serial No. 507,562 filed May 11, 1955 (now Patent No. 2,933,185). Another printed publication to which reference can be made for a showing of this classifier is the corresponding British Patent No. 795,480, dated May 21, 1958. When the shear is cutting sheets whose length differs from the nominal length, my device shows the direction and magnitude of the shearing error and thus guides an operator in adjusting the shear. Nevertheless, the device has general application for measuring articles moving in succession along a conveyor or the like for a dimension between two opposed edges of each article transverse to its direction of movement, and the invention is not limited to use in any specific environment.

An object of the invention is to provide an improved measuring device which utilizes instantaneously responding electronic means including an oscilloscope to furnish a measurement indication having infinite resolution, rather than measuring only by fixed increments.

A further object is to provide a measuring device of the foregoing type capable of measuring over a broad band not necessarily confined to a narrow tolerance range. For example, a classifier may throw out sheets whose length differs from the nominal by more than plus ⅛ inch or minus ¹⁄₁₆ inch, but my device used in conjunction therewith may measure a band a half inch or more in breadth.

A more specific object is to provide a measuring device of the foregoing type which displays its measurement on a cathode ray tube of an oscilloscope, where the measurement is suitably magnified, has infinite resolution, and covers a band of any reasonable breadth.

In accomplishing these and other objects of the invention, I have provided improved details of structure, preferred forms of which are shown in the accompanying drawings, in which:

FIGURE 1 is a schematic diagram, not to scale, of a portion of a shear line equipped with a measuring device constructed in accordance with my invention;

FIGURE 2 is a plan view of a template on which length measurements appear with the device shown in FIGURE 1; and FIGURE 3 is a schematic view similar to FIGURE 1, but showing a modification.

FIGURE 1 shows diagrammatically a conveyor belt 10 which carries individual sheets S from left to right, a drive motor 11 for the conveyor, and a deflector 12 at the exit end of the conveyor for throwing out off-length sheets. As in the Coleman and McLauchlan application, a gage plate 13 beneath the carrying flight of the conveyor provides two openings 14 and 15 offset a short distance in the direction of sheet travel, and another opening 16 spaced in the direction of sheet travel from the first two openings by approximately a sheet length. The transverse edges of openings 14 and 15 toward the entry of the conveyor and of opening 16 toward the exit end are machined accurately. The distance between the machined edges of openings 14 and 16 equals the maximum length of an acceptable sheet and that between the machined edges of openings 15 and 16 the minimum, whereby the offset between the machined edges of openings 14 and 15 equals the tolerance range. For example if sheets S nominally are 30 inches long, these distances may be respectively 30⅛ inches and 29¹⁵⁄₁₆ inches, and the offset ³⁄₁₆ inch. Preferably opening 16 is physically located in the upper face of a block 17 fixed to plate 13, and openings 14 and 15 in the upper face of a block 18 mounted on the plate for adjustment in the direction sheet travel, whereby the device can be set for sheets of different nominal length. To effect such adjustment, I have illustrated diagrammatically a feed screw 19 to which block 18 is connected, a dial indicator 20 which shows the position of adjustment of the block, and a flexible shaft 21 connecting the screw and indicator.

Two photocells 24 and 25 are mounted in block 18, and a photocell 26 is mounted in block 17 directly under openings 14, 15 and 16 respectively. A light source 27 is mounted above conveyor 10 and plate 13 to cast beams on the openings and photocells as long as no sheet is interposed. When the trailing edge of a sheet successively uncovers the machined edges of openings 14 and 15, the respective photocells 24 and 25 transmit electric signals to a circuit 28. Likewise when the leading edge of the sheet covers the machined edge of opening 16, photocell 26 transmits a signal thereto. If the sheet is of acceptable length, the signal from photocell 26 occurs after that from photocell 24 but before that from photocell 25. If the sheet is too long or too short, the signal from photocell 26 occurs before that from photocell 24 or after that from photocell 25. Circuit 28 acts automatically in response to the sequence of signals to pass acceptable sheets or to operate deflector 12 at the proper time to throw out off-length sheets. Circuit 28 preferably is similar to that shown and claimed in the Coleman and McLauchlan application; hence the description is not repeated here.

The device of my invention includes a flip-flop or bistable multivibrator 30 per se of conventional construction connected to photocells 24 and 25. As is well known in the art, a flip-flop has two stable current-conducting conditions and it can be changed from one to the other by an outside stimulus. In my device the current conduction path through the flip-flop 30 changes when the trailing edge of each sheet S uncovers the machined edge of opening 14 and changes back when the same trailing edge uncovers the machined edge of opening 15. In each instance the electric siganl from the respective photocell 24 or 25 furnishes the necessary stimulus for changing the flip-flop.

My device further includes a tachometer-generator 31 driven by the conveyor motor 11 and a sweep generator 32 connected to the tachometer-generator and controlled by the flip-flop. The tachometer-generator produces a voltage proportionate to the sheet speed. During the interval while the trailing edge of a sheet travels between the machined edges of openings 14 and 15, the sweep generator produces a ramp voltage; that is, its voltage output starts to increase as the trailing edge uncovers the edge of opening 14, increases at a rate proportionate to sheet speed until the sheet uncovers the edge of opening 15, and then suddenly reverts to near zero. The sweep generator illustrated comprises a triode 33 whose plate is connected to the tachometer-generator 31 through a resistor 34 and whose cathode is grounded. The grid of the triode is connected to a positive voltage source through a relatively high resistor 35 and to the flip-flop through a capacitor 36. A capacitor 37 is connected in parallel with the plate-cathode circuit of the triode. Normally the grid receives a positive potential via resistor 35, whereby the triode conducts the plate current to ground. When a signal from photocell 24 changes the current path through the flip-flop, the latter transmits a negative potential to the grid via capacitor 36, whereupon the triode ceases to conduct and the tachometer-generator 31 charges the capacitor 37 through resistor 34. The voltage output from the triode plate is applied to an amplifier 38 of a conventional oscilloscope 39. This voltage increases at a rate proportionate to the sheet speed until the flip-flop changes back, whereupon the triode again conducts and the voltage applied to the amplifier again is effectively zero.

The oscilloscope includes a cathode ray tube 42, and the amplifier 38 is connected to the horizontal plates of this tube. An electron beam is turned on at the right side of the tube at the instant the trailing edge of sheet S uncovers the machined edge of opening 14, is driven across the face of the tube at a rate proportionate to the sheet speed, and turned off at the instant the trailing edge uncovers the machined edge of opening 15. The resulting trace is always of the same length regardless of the sheet speed. The oscilloscope also includes a vertical amplifier 43 connected to photocell 26 and to the vertical plates of the cathode ray tube. When photocell 26 transmits a signal as the leading edge of a sheet covers the machined edge of opening 16, amplifier 43 applies a vertical signal to the cathode ray tube. If the sheet is of acceptable length, the vertical signal deflects the horizontal electron beam up the face of the tube and appears as a promontory or pip on the trace. If the sheet is too long or too short, no vertical signal is visible.

FIGURE 2 shows a preferred form of template 44 carried by the cathode ray tube 42 for visibly displaying sheet length measurements. The template bears a graduated scale 45 on which the nominal or intended sheet length is indicated at 46. Scale 45 is appropriately magnified in length over the actual distance between the machined edges of openings 14 and 15, but all dimensions remain in proportion. The horizontal beam of the cathode ray tube is visible as a trace 47 parallel with the scale, and the pip is visible thereon as indicated at 48. The oscilloscope includes conventional horizontal gain and zero controls 49 and 50 connected to amplifier 38. These controls can be adjusted to regulate the length and starting point of trace 47 so that the trace conforms with scale 45. Similarly vertical gain and zero controls 51 and 52 are connected to amplifier 43. These latter controls can be adjusted to regulate the height of pip 48 and the vertical position of trace 47 relative to scale 45.

FIGURE 3 shows schematically a modification in which the measurement band is broader than the tolerance band. To simplify the showing, such parts as the conveyor, deflector, tachometer-generator, and light source are omitted, but they can be arranged the same as in FIGURE 1. In addition to the openings 14 and 15 and photocells 24 and 25, which define the tolerance band, the movable block 18a has openings 60 and 61 and corresponding photocells 62 and 63 which define the measurement band. The latter openings and photocells are located outside the former and define a band of any desired breadth. Photocells 62 and 63 are connected to the flip-flop 30 and provide signals for its operation in the same manner as photocells 24 and 25 in the embodiment shown in FIGURE 1. In like manner the flip-flop controls the sweep generator 32, which produces a ramp voltage input to the horizontal amplifier 38, which in turn supplies voltage for producing a horizontal beam in the cathode ray tube 42, but the trace 47a of this beam now represents the broadened measurement band. Photocell 26 is connected to the vertical amplifier 43 through a buffer amplifier 64 to produce a pip 48a when the leading edge of each sheet covers opening 16, as in the first embodiment. Photocells 24 and 25 now are connected to the vertical amplifier 43 through buffer amplifiers 65 and 66 to produce additional pips 67 and 68 on the trace 47a when the trailing edge of a sheet uncovers openings 14 and 15. These additional pips locate the tolerance band on the trace 47a, whereby the location of pip 48a shows the sheet length directly with relation to the tolerance band. If desired, the cathode ray tube can carry a template with a graduated scale as in the first embodiment.

From the foregoing description it is seen that either embodiment of my invention affords a measurement of a linear dimension, such as the length of a sheet, having infinite resolution, since there are no restrictions as to where the pip representative of the dimension may lie along the trace representative of the measurement or tolerance band. As long as the dimension is within the tolerance band, the first embodiment furnishes an exact measurement and enables an operator to adjust the shear with precision. The second embodiment offers the further advantage of furnishing this type of measurement for articles whose measured dimension is outside the tolerance band.

While I have shown and described certain preferred embodiments of my invention, it is apparent that other modifications may arise. Therefore, I do not wish to be limited to the disclosure set forth but only by the scope of the appended claims.

I claim:

1. A device for measuring a linear dimension of moving articles having opposed edges transverse to the direction of movement, said device comprising means for producing a visible trace of constant length regardless of the article speed as one transverse edge of each article travels a predetermined distance, and means for producing a visible pip on said trace as the other transverse edge of the article passes a predetermined point, the position of said pip with respect to said trace being an indication of the dimension between its transverse edges.

2. A device for measuring a linear dimension of moving articles having opposed edges transverse to the direction of movement, said device comprising means for producing a visible horizontal trace of constant length regardless of the article speed as one transverse edge of each article travels a predetermined distance, and means for producing a visible vertical pip on said trace as the other transverse edge of the article passes a predetermined point, the position of said pip with respect to said trace being an indication having infinite resolution of the dimension of the article between its transverse edges.

3. A device for measuring a linear dimension of moving articles having opposed edges transverse to the direction of movement, said device comprising a cathode ray tube, means for producing on said tube a horizontal trace of constant length regardless of the article speed as one transverse edge of each article travels a predetermined distance, and means for producing a vertical signal on said tube as the other transverse edge of the article passes a predetermined point, the position of said vertical signal with respect to said trace being an indication of the dimension of the article between its transverse edges.

4. A device for measuring a linear dimension of moving articles having opposed edges transverse to the direction of movement, said device comprising a cathode ray tube, photoelectric means responding to the passing of one transverse edge of each article twice with an interval therebetween, additional photoelectric means responding to the passing of the other transverse edge of the article means operatively connected with said first named photoelectric means and said tube for producing on said tube a horizontal trace of constant length regardless of the article speed during the interval between its two responses, and means operatively connected with said additional photoelectric means and said tube for producing a vertical signal on said tube as said additional photoelectric means responds, the position of said vertical signal with respect to said trace being an indication of the dimension of the article between its transverse edges.

5. A device for measuring a linear dimension of moving articles having opposed edges transverse to the direction of movement, said device comprising a pair of offset photocells responding to the passing of one transverse edge of each article twice with an interval therebetween, a third photocell spaced from said offset photocells by approximately the dimension of the article between its transverse edges and responding to the passing of the other transverse edge of the article, a cathode ray tube having horizontal and vertical plates, means operatively connected with said offset photocells and said horizontal plates for producing a visible horizontal trace of constant length regardless of the article speed during the interval between their two responses, and means operatively connected with said third photocell and said vertical plates for producing a visible pip on said trace as said third photocell responds, the position of said pip with respect to said trace being an indication of the dimension of the article between its transverse edges.

6. A device for measuring a linear dimension of moving articles having opposed edges transverse to the direction of movement, said device comprising a pair of offset photocells responding to the passing of one transverse edge of each article twice with an interval therebetween, a third photocell spaced from said offset photocells by approximately the dimension of the article between its transverse edges and responding to the passing of the other transverse edge of the article, a cathode ray tube having horizontal and vertical plates, a flip-flop operatively connected with said offset photocells, means including a sweep generator controlled by said flip-flop and operatively connected with said horizontal plates for applying a ramp voltage to said horizontal plates during the interval between the two responses of said offset photocells and thereby producing a visible horizontal trace on said tube, and means operatively connected with said third photocell for producing a visible pip on said trace as said third photocell responds, the position of said pip with respect to said trace being an indication of the dimension of the article between its transverse edges.

7. A device for measuring a linear dimension of moving articles having opposed edges transverse to the direction of movement, said device comprising a cathode ray tube, means for producing on said tube a horizontal trace of constant length regardless of the article speed as one transverse edge of each article travels a predetermined distance, means for producing vertical signals on said tube as the same transverse edge of the article travels a shorter predetermined distance representative of a tolerance range within the first distance, and means for producing another vertical signal on said tube as the other transverse edge of the article passes a predetermined point, the positions of said first vertical signals with respect to said trace being an indication of the tolerance band and the position of said last named vertical signal being an indication of the dimension of the article between its transverse edges.

8. The combination, with a conveyor adapted to carry a succession of articles having opposed edges transverse to the direction of conveyor travel, of a device for measuring the linear dimension of each article between its transverse edges, said device comprising means associated with said conveyor for producing a visible trace as one transverse edge of each article travels a predetermined distance, and means associated with said conveyor for producing a visible pip on said trace of constant length regardless of the conveyor speed as the other transverse edge of the article passes a predetermined point, the position of said pip with respect to said trace being an indication of the dimension of the article between its transverse edges.

9. The combination, with a conveyor adapted to carry a succession of articles having opposed edges transverse to the direction of conveyor travel, of a device for measuring the linear dimension of each article between its transverse edges, said device comprising a cathode ray tube, means associated with said conveyor for producing on said tube a horizontal trace of constant length regardless of the conveyor speed as one transverse edge of each article travels a predetermined distance, and means associated with said conveyor for producing a vertical signal on said tube as the other transverse edge of the article passes a predetermined point, the position of said vertical signal with respect to said trace being an indication of the dimension of the article between its transverse edges.

10. The combination, with a conveyor adapted to carry a succession of articles having opposed edges transverse to the direction of conveyor travel, of a device for measuring the linear dimension of each article between its transverse edges, said device comprising a pair of offset photocells associated with said conveyor and responding to the passing of one transverse edge of each article twice with an interval therebetween, a third photocell spaced from said offset photocells by approximately the dimension of the article between its transverse edges and responding to the passing of the other transverse edge of article, a cathode ray tube having horizontal and vertical plates, means operatively connected with said offset photocells and said horizontal plates for producing a visible horizontal trace during the interval between their two responses, and means operatively connected with said third photocell and said vertical plates for producing a visible pip on said trace as said third photocell responds, the position of said pip with respect to said trace being an indication of the dimension of the article between its transverse edges.

References Cited in the file of this patent

UNITED STATES PATENTS

| | | |
|---|---|---|
| 2,171,362 | Gulliksen | Aug. 29, 1939 |
| 2,280,948 | Gulliksen | Apr. 28, 1942 |
| 2,694,804 | Wagner | Nov. 16, 1954 |
| 2,848,921 | Koulikovitch | Aug. 26, 1958 |
| 2,882,783 | Blackstone | Apr. 21, 1959 |
| 2,916,633 | Stone et al. | Dec. 8, 1959 |
| 2,933,185 | Coleman et al. | Apr. 19, 1960 |

UNITED STATES PATENT OFFICE
CERTIFICATE OF CORRECTION

Patent No. 3,061,732                      October 30, 1962

James A. Milnes

It is hereby certified that error appears in the above numbered patent requiring correction and that the said Letters Patent should read as corrected below.

Column 6, lines 8 and 9, strike out "of constant length regardless of the conveyor speed" and insert the same after "trace" in line 5, same column 6.

Signed and sealed this 2nd day of April 1963.

(SEAL)
Attest:

ESTON G. JOHNSON                          DAVID L. LADD

Attesting Officer                           Commissioner of Patent